US007011419B2

(12) United States Patent
Gruhlke et al.

(10) Patent No.: US 7,011,419 B2
(45) Date of Patent: Mar. 14, 2006

(54) METHOD AND SYSTEM FOR CHANGING THE CROSS-SECTIONAL PROFILE OF A BEAM OF LIGHT

(76) Inventors: Russell Wayne Gruhlke, 800 Cambridge Dr., Fort Collins, CO (US) 80525; Susan Hunter, 1710 Enchantment Dr., Fort Collins, CO (US) 80525

( * ) Notice: Subject to any disclaimer, the term of this patent is extended or adjusted under 35 U.S.C. 154(b) by 147 days.

(21) Appl. No.: 10/705,141

(22) Filed: Nov. 10, 2003

(65) Prior Publication Data

US 2005/0099667 A1    May 12, 2005

(51) Int. Cl.
*G02B 5/10* (2006.01)
*F21V 7/00* (2006.01)

(52) U.S. Cl. ............... 359/852; 359/636; 359/857; 362/346; 362/292

(58) Field of Classification Search ........... 362/346, 362/292, 266, 290, 297, 304, 305, 307, 308, 362/341, 342; 359/222, 636, 637, 850–852, 359/857, 599; 385/39
See application file for complete search history.

(56) References Cited

U.S. PATENT DOCUMENTS 5,694,250 A * 12/1997 Anderson .................. 359/631
2003/0165290 A1    9/2003 Bhagavatula et al.

* cited by examiner

*Primary Examiner*—Evelyn A. Lester

(57) ABSTRACT

A technique for changing the cross-sectional profile of a beam of light from, for example, circular or elliptical to thin involves dividing the beam of light into cross-sectional portions, rotating the cross-sectional portions, and then concatenating the rotated cross-sectional portions to form a thin beam. The resulting thin beam has a long dimension that is formed by the concatenation of the cross-sectional portions of the original beam. A device for changing the cross-sectional profile of a beam of light may be fabricated with silicon optical bench technologies or other molding technologies. The device includes facets that divide a beam of light into cross-sectional portions, rotate the cross-sectional portions, and then concatenate the rotated cross-sectional portions to form a thin beam.

20 Claims, 9 Drawing Sheets

METHOD AND SYSTEM FOR CHANGING THE CROSS-SECTIONAL PROFILE OF A BEAM OF LIGHT

FIELD OF THE INVENTION

The present invention relates generally to optics, and more particularly to changing the cross-sectional profile of a beam of light.

BACKGROUND OF THE INVENTION

The miniaturization of optical components is a frequent goal in the design of modern optical systems. For example, it is highly desirable to package telecommunications hardware into modules that fit into the bays found in electronic equipment racks. Since electronic bays are often thin rectangular slots, the modules fitting into the slots must be thin or "board-like" in shape. Optical components fitting into such a module must also be thin or narrow in one dimension.

Light emitted from an optical fiber expands into a cone of light characterized by a circular cross-sectional profile at any distance from the fiber end. Accommodating light having a circular cross-sectional profile requires lenses and other optical components that are not always compatible with thin modular geometry. Therefore, it is often necessary to convert light having a circular cross-sectional profile into light having a thin cross-sectional profile.

Cylindrical lenses have been used to convert the cross-sectional profile of light from circular to thin. These cylindrical lenses concentrate the optical power of a circular beam along a line of approximately the same width as the original beam, but with significantly reduced height. Although cylindrical lenses are able to concentrate a circular beam along a line, cylindrical lenses can be difficult and expensive to fabricate, especially at micro-dimensional sizes.

In view of the need for optical components with thin geometries, what is needed is a technique for changing the cross-sectional profile of a beam of light from circular to thin that is compatible with the thin geometries used in telecommunications systems and that is economical to fabricate.

SUMMARY OF THE INVENTION

A technique for changing the cross-sectional profile of a beam of light from, for example, circular or elliptical to thin involves dividing the beam of light into cross-sectional portions, rotating the cross-sectional portions, and then concatenating the rotated cross-sectional portions to form a thin beam. The resulting thin beam has a long dimension that is formed by the concatenation of the cross-sectional portions of the original beam. A beam of light having a thin cross-sectional profile can be used in telecommunications systems that utilize thin geometries.

A device for changing the cross-sectional profile of a beam of light may be fabricated with silicon optical bench technologies or other molding technologies. The device includes facets that divide a beam of light into cross-sectional portions, rotate the cross-sectional portions, and then concatenate the rotated cross-sectional portions to form a thin beam. Many of these devices can be simultaneously fabricated onto a common substrate or "wafer." Additionally, these devices can be produced on a micro-dimensional scale for use in telecommunications hardware modules.

BRIEF DESCRIPTION OF THE DRAWINGS

Throughout the description, similar reference numbers may be used to identify similar elements.

DETAILED DESCRIPTION OF THE INVENTION

Figure 1:
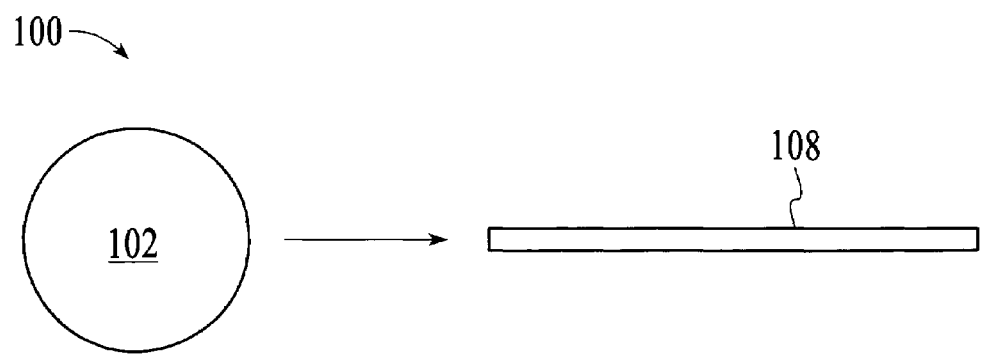
FIG. 1 illustrates a change in the cross-sectional profile of a beam of light from elliptical to thin.

As shown in the drawings for the purposes of illustration, the invention involves changing the cross-sectional profile of a beam of light. In an embodiment, a substrate includes multiple facets that convert a beam of light to a thin beam. In an embodiment that includes a typical light source, such as an optical fiber, the initial beam of light has a circular or, more generally, an elliptical cross-sectional profile. Throughout the description, the term elliptical is taken to include circular.

FIG. 1 illustrates a change in the cross-sectional profile of a beam of light from an elliptical beam of light 102 to a thin beam 108. The elliptical beam of light 102 may propagate as a cone or a collimated beam of light. The elliptical beam of light 102 has an elliptical or circular cross-sectional profile. The cross-sectional profile of the beam of light is changed, in accordance with the invention, to a beam of light 108 with a cross-sectional profile that may be described, for example, as thin, narrow, rectangular, or linear but is described herein as "thin." As depicted in FIG. 1, the thin beam of light 108 has a substantially rectangular cross-sectional profile that is characterized as thin because one dimension of the rectangle (e.g., the height dimension) is small compared to the other dimension of the rectangle (e.g., the width).

Figure 2:
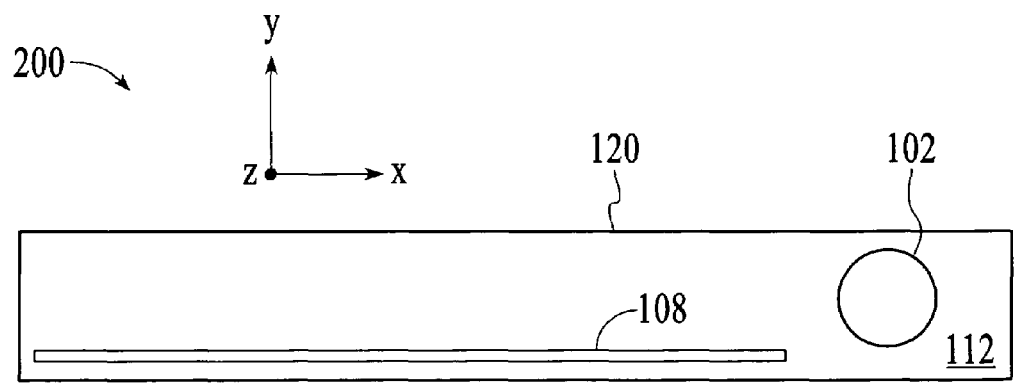
FIG. 2 is a top view of a substrate illustrating the profile of an elliptical beam of light passing into and the profile of a thin beam of light passing out of the substrate according to the invention.

FIG. 2 depicts a top view of a substrate 120 that includes the cross-sectional outline of a beam of light that enters the substrate with an elliptical cross-sectional profile and exits the substrate with a thin cross-sectional profile. The substrate 120 includes a major surface 112, for example, a top surface. The elliptical beam of light 102 incident on the major surface 112 of the substrate 120 has an elliptical profile at the area of incidence on the major surface 112. The substrate 120 includes a structure (not shown in FIG. 2), which is the focus of the invention, for changing the cross-sectional profile of the elliptical beam of light 102 to the thin beam 108. Accordingly, when the beam 108 passes out of the substrate 120, it has a thin cross-sectional profile at the area of exit from the major surface 112 of the substrate. The dimensions of the thin beam relative to the elliptical beam are implementation specific and may differ from the dimensions depicted.

Figure 3:
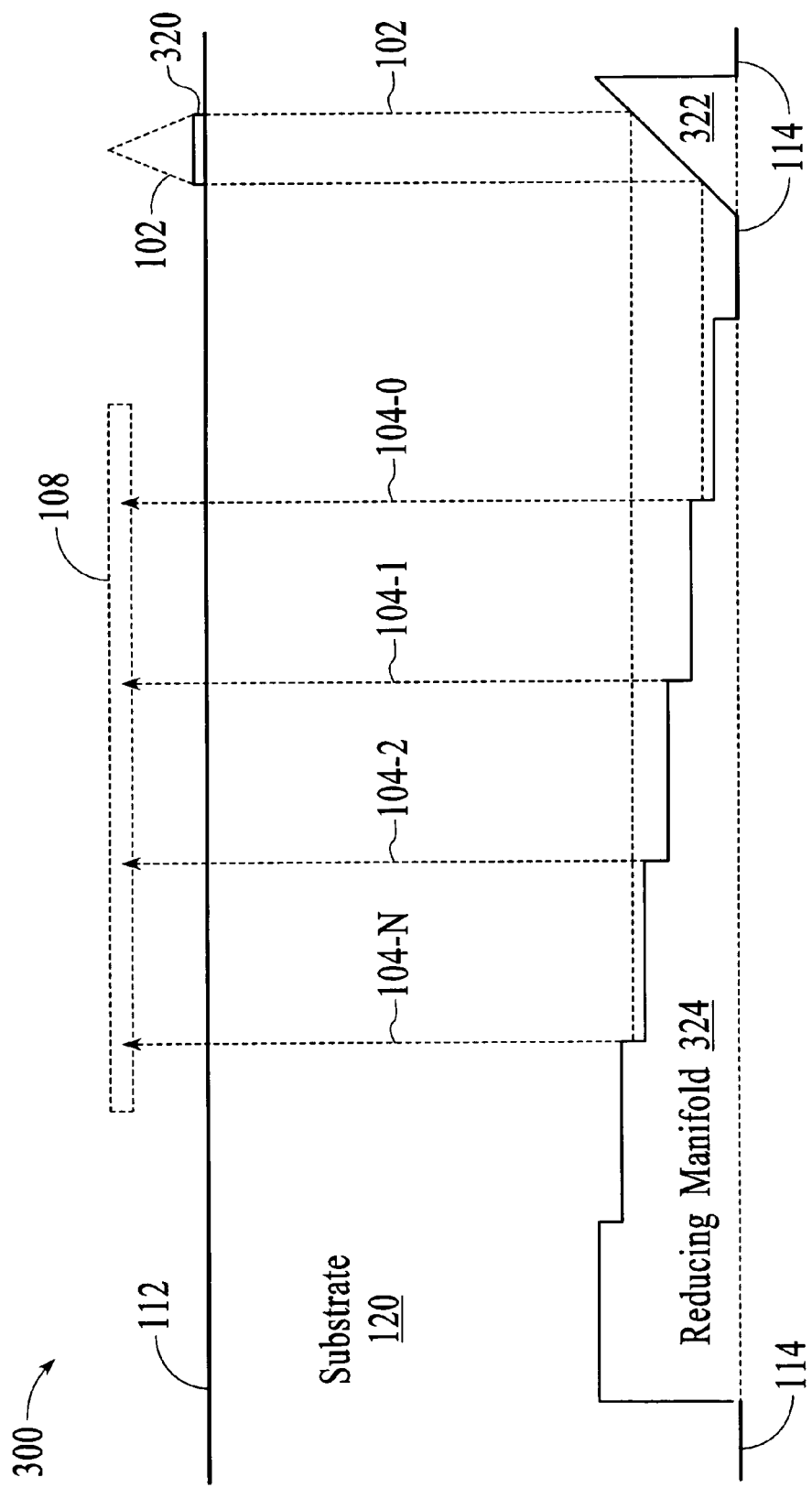
FIG. 3 depicts an optical system according to the invention.

FIG. 3 depicts a side view of an optical system 300 according to the invention. The optical system 300 changes a beam of light having an elliptical cross-sectional profile to a beam of light having a thin cross-sectional profile. The optical system is embodied in a substrate 120 that has opposed major surfaces 112 and 114. The major surfaces are referred to below as "top" and "bottom" surfaces for the purposes of description only. The optical system includes a converging optical element 320, a reflector 322, and a structure referred to below as a reducing manifold 324. The converging optical element 320 may be a refractive lens, coating, or other structure for collimating light. Alternatively, the converging optical element 320 may be part of the top surface 112 of the substrate 120. In another alternative, the converging optical element may be diffractive. The reflector 322 and reducing manifold 324 include total-internal-reflection (TIR) facets, which are etched, molded, or otherwise formed on the bottom surface of 114 of the substrate 120. The reflector 322 or reducing manifold 324 may alternatively have some other type of reflective surface, such as a metallic mirror, for reflecting light. A more detailed description of the structural arrangement of the reducing manifold is provided below with reference to FIGS. 4A through 5. In the embodiment of FIG. 3, the converging optical element 320 is located on the top surface 112 of the substrate 120 at a location where an optical beam 102 having an elliptical cross-sectional profile is received. The reflector 322 is located on the opposite surface 114 as the converging optical element such that a beam of light received at the converging optical element propagates through the substrate to the reflector 322. The reflector and reducing manifold are oriented with respect to each other such that the beam of light that propagates to the reflector from the converging optical element is reflected towards the reducing manifold. The reducing manifold is oriented such that a beam of light received from the reflector is reflected towards the top surface of the substrate.

In operation, a beam of light 102 having an elliptical cross-sectional profile (referred to herein as an "elliptical beam of light") is provided to the system 300 at the converging optical element 320. The elliptical beam of light may be received from any source of electromagnetic radiation, including but not limited to an optical fiber, a light emitting diode (LED), or some other source of electromagnetic radiation that either generates, transmits, or otherwise provides a beam of electromagnetic radiation (referred to herein as the beam of light). The received elliptical beam of light is collimated by the converging optical element 320 as the beam of light 102 enters the substrate 120. The collimated light travels through the substrate 120 and is incident on the reflector 322. The reflector 322 reflects the elliptical beam of light 102 toward the reducing manifold 324. The reducing manifold 324 redirects cross-sectional portions 104-0 to 104-N of the light (collectively referred to below as cross-sectional portions 104) in such a way that the beam of light is changed from having an elliptical cross-sectional profile to having a thin cross-sectional profile. The beam of light 108 with the thin cross-sectional profile exits the substrate 120 through the top surface 112. In an exemplary embodiment, the elliptical beam of light has a diameter of approximately 100 μm and the thin beam has a width dimension of approximately 1,000 μm.

In the exemplary embodiment of FIG. 3, the elliptical beam of light 102 enters the substrate 120 through the top surface 112 and the thin beam 108 exits the substrate 120 through the same surface. In alternative embodiments, the elliptical beam of light 102 enters the substrate through the top surface and the thin beam 108 exits the substrate through the bottom surface 114.

Figure 4A:
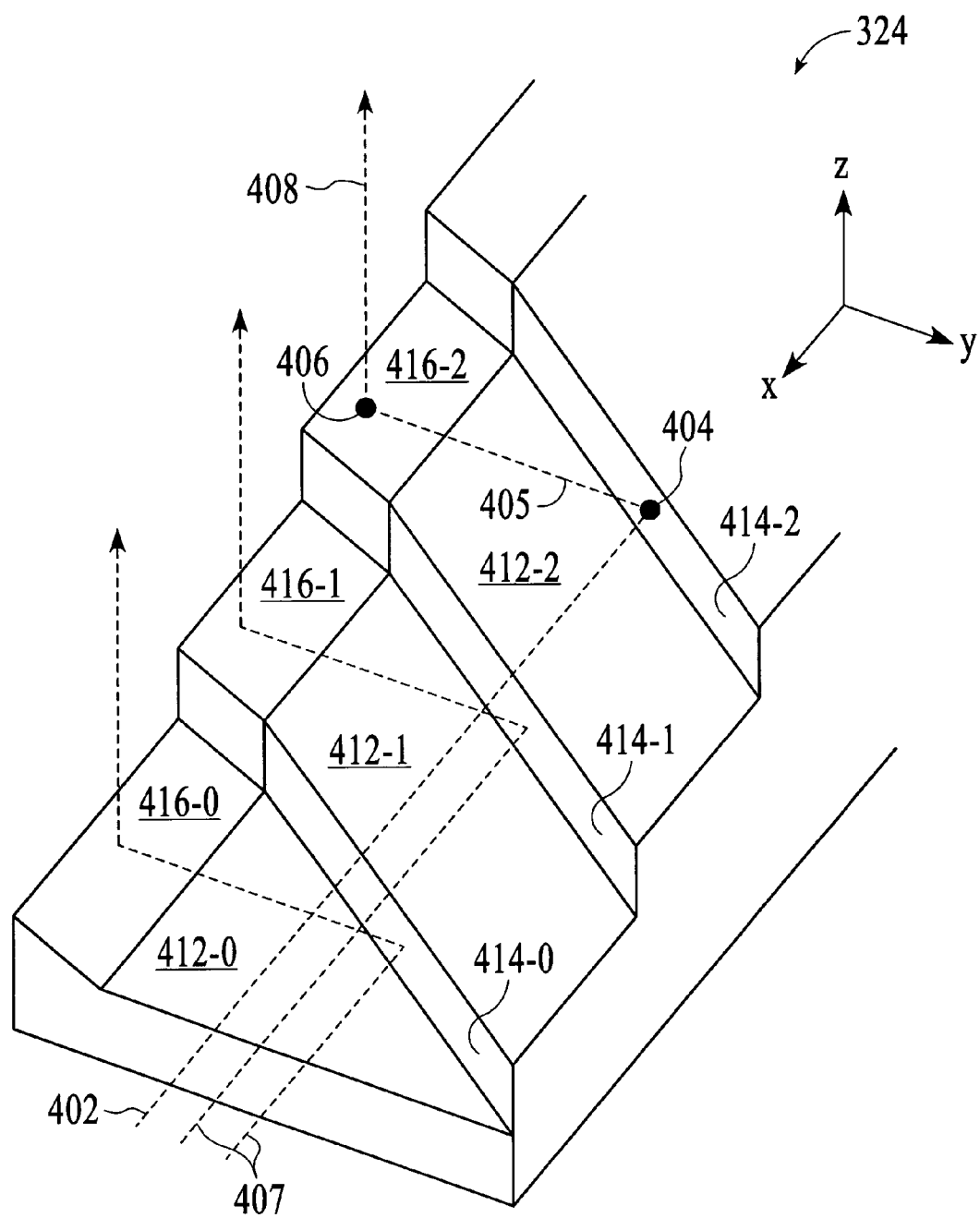
FIG. 4A depicts part of a reducing manifold for use with the system of FIG. 3.

To more clearly illustrate the redirection of cross-sectional portions of the elliptical beam of light 102 in accordance with the invention, an expanded perspective view of a portion of the reducing manifold 324 from FIG. 3 is depicted in FIG. 4A. The expanded perspective view is from inside the substrate 120 and the depicted structure is formed by the surface features of the substrate. The expanded perspective view depicts structural features of the reducing manifold, which are referred to herein as "steps." Each step of the reducing manifold 324 includes a surface 412 and two facets 414 and 416. For example, Step 0 of the reducing manifold 324 includes surface 412-0 and facets 414-0 and 416-0 and Step 1 includes surface 412-1 and facets 414-1 and 416-1. With reference to the x, y, and z axes depicted in FIG. 4A, the major surfaces 112 and 114 of the substrate are substantially parallel to the x-y plane. The surfaces 412 (e.g., 412-0, 412-1, and 412-2) are substantially parallel to the major surfaces 112 and 114 of the substrate and to the x-y plane. The surfaces 412 are stepped from each other in the z-direction. The facets 414 are offset from each other in the x-direction by the surfaces 412. The facets 414 are stepped from each other in the z-direction and appear to be directly adjacent to each other or "stacked" on top of each other when viewed along the x-axis. The facets 414 are referred to below as "stepped" facets.

Figure 4B:
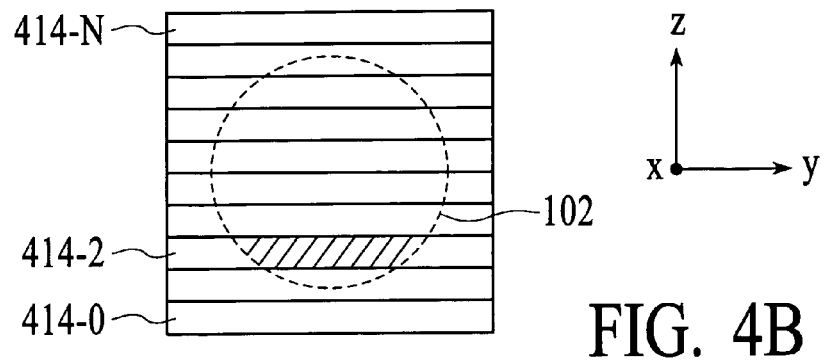
FIG. 4B depicts multiple stepped facets as viewed along the x-axis.

FIG. 4B depicts multiple stepped facets 414 as viewed along the x-axis. Referring back to FIG. 4A, the stepped facets 414 are oriented at approximately 45 degrees relative to the z-y plane such that the stepped facets 414 face towards the end-to-end facets 416. As is described below, the angle of the facets 414 is set to cause light propagating along the x-axis to be reflected towards the facets 416. Although an angle of 45 degrees is described, other angles are possible. The facets 416 are connected to one side of the surfaces 412 and are located such that light reflected by the stepped facets 414 is incident on the facets 416. The facets 416 are inclined relative to the x-y plane at approximately 45 degrees such that light received from the stepped facets 414 is reflected parallel to the z-axis. As is described in more detail below, the facets 416 are also oriented such that cross-sectional portions of a beam are concatenated end-to-end to form a thin beam. The facets 416 are referred to below as "end-to-end" facets. In an exemplary micro-structure, the surfaces 412 have an x-dimension of approximately 100 μm and the stepped facets 414 have a z-dimension of approximately 10 μm.

The orientation of the stepped facets 414 and end-to-end facets 416 is further described with regard to light that propagates toward the reducing manifold in a direction that is substantially parallel to the x-axis. Specifically, the orientation of the stepped and end-to-end facets is described with regard to light on a light path 402 depicted in FIG. 4A. Referring to FIG. 4A, light on the light path 402 passes over the surfaces 412-0, 412-1, and 412-2 and is incident on the stepped facet 414-2 at point 404. The stepped facet 414-2 directs the light toward the end-to-end facet 416-2 on a light path 405, which is substantially orthogonal to the light path 402. The light on light path 405 is incident on the end-to-end facet 416-2 at point 406. The end-to-end facet 416-2 redirects the light along the light path 408, which is substantially orthogonal to light paths 402 and 405. Light paths 407 incident on stepped facets 414-0 and 414-1 are also depicted.

Figure 4C:
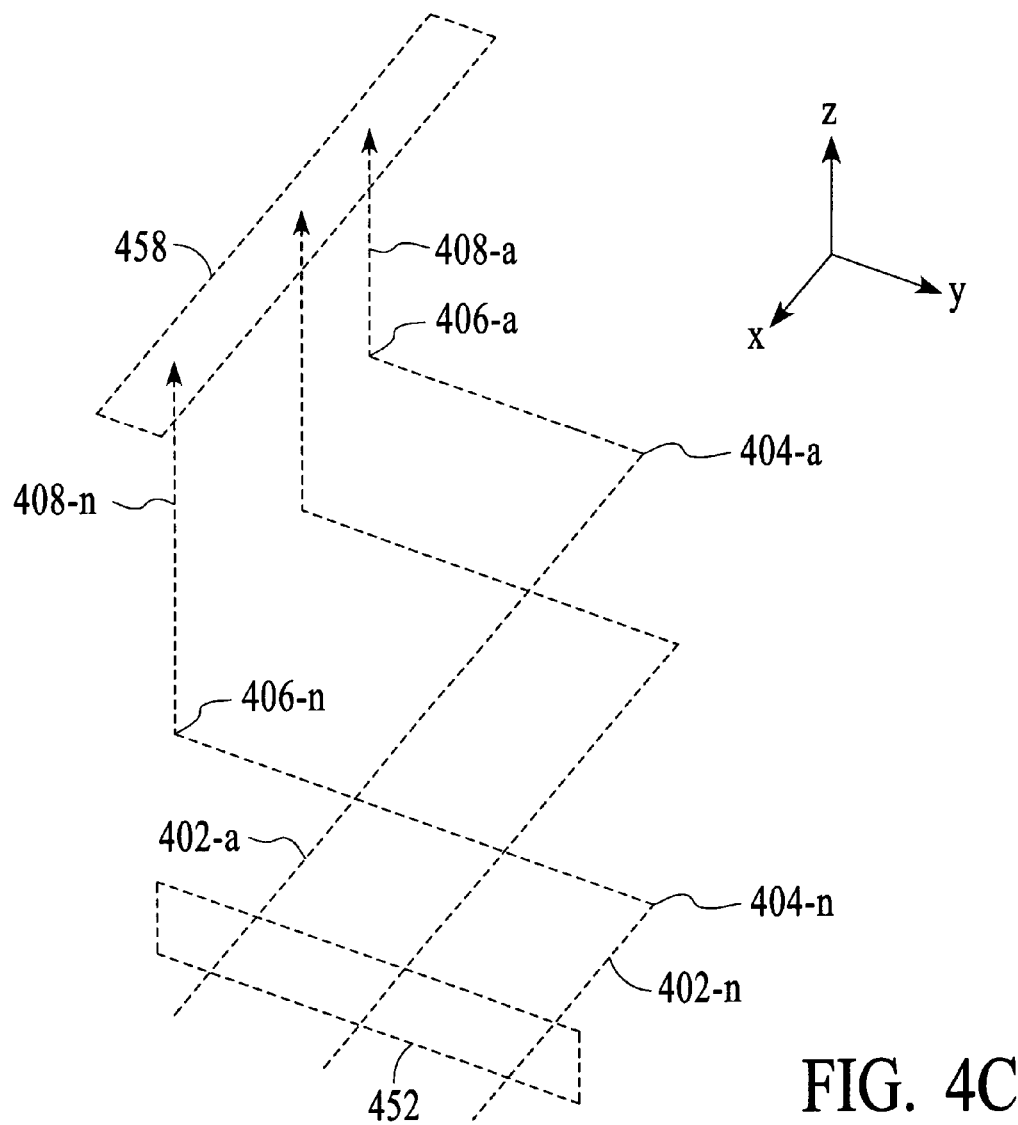
FIG. 4C depicts an entire cross-sectional portion of a beam of light that is redirected by facets of the reducing manifold from FIG. 4A.

FIG. 4C depicts one of the cross-sectional portions of a beam of light that is redirected by the reducing manifold 324 (FIG. 4A). Specifically, FIG. 4C illustrates how light paths of the cross-sectional portion 452 of a beam of light are directed by a stepped facet and redirected by an end-to-end facet to yield a cross-sectional portion 458 of the beam of light. As shown in FIG. 4C, the cross-sectional portion 452 of the beam of light includes multiple light paths 402-$a$ to 402-$n$ (referred to collectively herein as light paths 402), each of which travels a similar path to the light path 402 in FIG. 4A. The cross-sectional portion 452, which includes the light paths 402, is directed, for example, by the stepped facet 414-2 at points 404-$a$ to 404-$n$ in a manner similar to that described with reference to FIG. 4A at point 404. The light is then redirected by the end-to-end facet 416-2 along light paths 408-$a$ to 408-$n$ (referred to collectively herein as light paths 408) at points 406-$a$ to 406-$n$ in a manner similar to that described with reference to FIG. 4A at point 406. The light paths 408 collectively form the cross-sectional portion 458. In an embodiment, the cross-sectional portion 458 is dimensionally the same size as the cross-sectional portion 452, but is differently oriented. Specifically, the cross-sectional portion 458 has a dimension in the x-direction that is the same as the dimension in the y-direction of the cross-sectional portion 452 and a dimension in the y-direction that is the same as the dimension in the z-direction of the cross-sectional portion 452. Conceptually, the cross-sectional portion 452 is rotated a first time by 90 degrees about the y-axis and is rotated a second time by 90 degrees about the z-axis. A thin beam of light is formed by concatenating many of the cross-sectional portions 458 along a line parallel to the x-axis.

Each step of the reducing manifold 324 directs light from a different cross-sectional portion of an elliptical beam of light. As described above, FIG. 4B depicts a view of the stepped facets 414 along the x-axis. FIG. 4B also depicts an exemplary cross-sectional profile of an elliptical beam of light 102 incident on the stepped facets 414. As depicted, the elliptical beam of light is incident on different stepped facets 414. The different stepped facets 414 divide the beam into separate cross-sectional portions similar to the cross-sectional portion 452 (FIG. 4C) and direct the separate cross-sectional portions to the respective end-to-end facets 416. The directing of the cross-sectional portions rotates the cross-sectional portions as described above with regard to FIG. 4C. The cross-sectional portion of the beam that is directed by stepped facet 414-2 is identified by the hatched lines.

Figure 5:
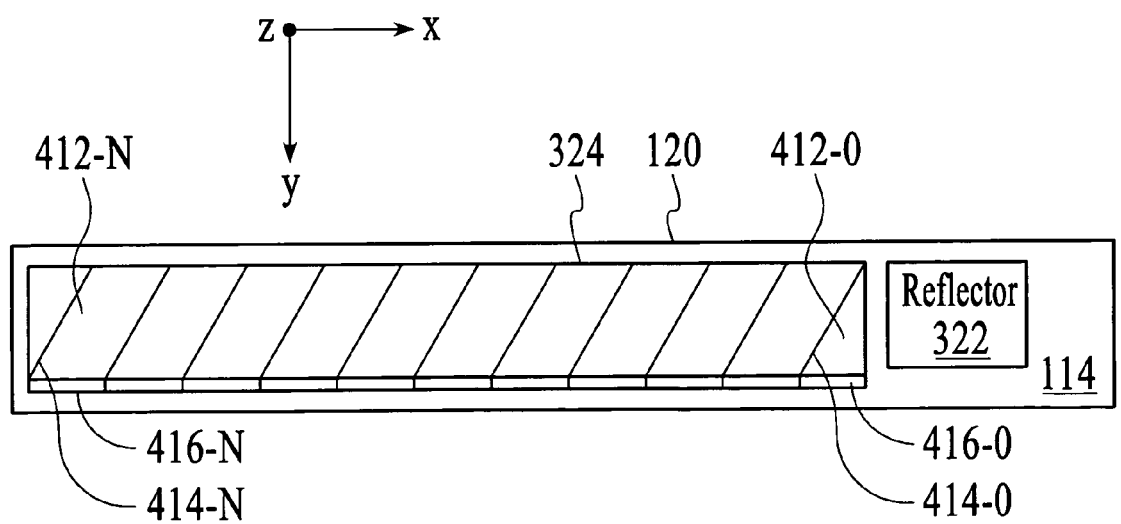
FIG. 5 depicts a bottom view of a substrate that includes a reducing manifold and a reflector.

FIG. 5 is a bottom view of the substrate 120 depicted in FIG. 3. FIG. 5 shows the reducing manifold 324 as described with reference to FIGS. 3, 4A, 4B, and 4C as viewed along the z-axis. The figure depicts surfaces 412-0 to 412-N (collectively referred to herein as surfaces 412), stepped facets 414-0 to 414-N (collectively referred to herein as stepped facets 414), and end-to-end facets 416-0 to 416-N (collectively referred to herein as end-to-end facets 416). The bottom view illustrates how the end-to-end facets 416 are concatenated parallel to the x-axis. As described above, the reducing manifold 324 receives an elliptical beam of light from the reflector 322. The elliptical beam of light passes over the successive surfaces 412 and is divided into cross-sectional portions by the stepped facets 414. The cross-sectional portions are directed by the stepped facets 414 towards respective end-to-end facets 416. The cross-sectional portions of the elliptical beam are redirected by the end-to-end facets 416 concatenated in the x-direction. In sum, the stepped facets 414, together with the end-to-end facets 416, divide an incoming beam of light into cross-sectional portions, rotate the cross-sectional portions, and then concatenate the rotated cross-sectional portions to form a thin beam.

The dimensions of a thin beam that is generated by an optical system as described above are a function of the size of the stepped facets 414 and the offset between the stepped facets. For example, a very thin beam can be generated with a reducing manifold that has stepped facets with a relatively small z-dimension, which are offset relatively far apart in the x-direction. Conversely, a less thin beam can be generated with a reducing manifold that has stepped facets with a relatively large z-dimension, which are offset by a relatively small distance in the x-direction. As can be seen from FIG. 4B, the z-dimensions of the stepped facets 414 have an effect on the x and y dimensions of the thin beam. For example, if the stepped facets are relatively small in the z-dimension, then the resulting thin beam will have a small y-dimension and a large x-dimension (i.e., the thin beam will be relatively thin). Conversely, if the facets are relatively large in the z-dimension, then the resulting thin beam will have a relatively large y-dimension and a relatively small x-dimension (i.e., the thin beam will be less thin).

Figure 4D:
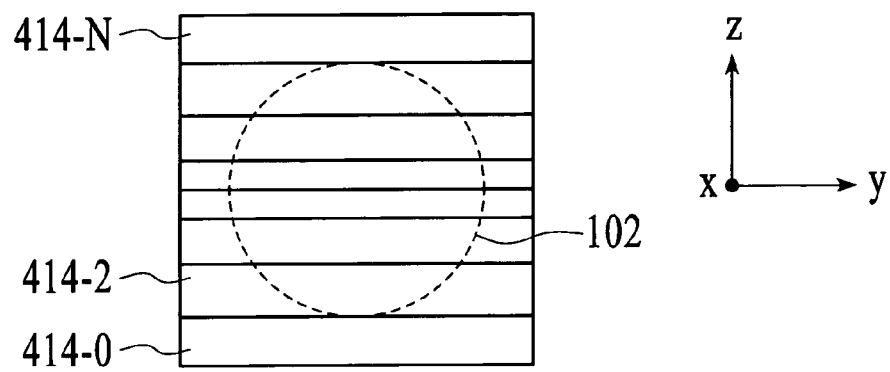
FIG. 4D depicts multiple stepped facets with different z-dimensions as viewed along the x-axis.

The distribution of the optical flux of the elliptical beam into the thin beam is a function of the size of the stepped facets 414 and the magnitude of the offset between the stepped facets in the x-direction. The size of the stepped facets and the resulting cross-sectional portions of the incident beam can be selected to produce a thin beam with a uniform optical flux. Assuming a Gaussian optical flux distribution of the elliptical beam, the optical flux at the center of the elliptical beam is greater than the optical flux at the periphery of the elliptical beam. To make the optical flux uniform in the long dimension of a thin beam, the z-dimension of the stepped facets 414 can be selected such that the optical flux associated with the cross-sectional portions of the elliptical beam is substantially uniform or at least more uniform than it would have been if all of the stepped facets had the same z-dimension. That is, the cross-sectional area of the stepped facets is set such that the reflected cross-sectional portions of the elliptical beam have equal optical flux per cross-sectional portion. The cross-sectional portions are then concatenated to produce a thin beam with a substantially homogenous optical flux along the long axis. In an embodiment, the optical flux can be homogenized by setting the z-dimension of the stepped facets that reflect the central portions of an incident beam to be smaller than the z-dimension of the stepped facets that reflect the peripheral portions of the incident beam. For example, FIG. 4D depicts a view of the stepped facets 414 along the x-axis in which the z-dimension of the stepped facets that reflect the central portions of an incident beam are smaller than the z-dimension of the stepped facets that reflect the outer portions of the incident beam. The optimal distribution of the z-dimensions among the stepped facets can be selected based on known and/or observed beam characteristics.

The optical flux of the thin beam is also a function of the offset in the x-direction between the stepped facets. For example, the offset in the x-direction between the stepped facets can be set such that the cross-sectional portions of the elliptical beam are concatenated with no gaps between the cross-sectional portions. The extent of any gaps between adjacent cross-sectional portions that form the thin beam will change the optical flux distribution of the thin beam. In an embodiment, the offset between the stepped facets is set such that the offset in the x-direction is greater than the y-dimension of the respective redirected cross-sectional portions of the elliptical beam. This will cause the thin beam to have gaps between the cross-sectional portions, thereby reducing the optical flux of the thin beam. With an elliptical beam, to achieve end-to-end concatenation with no gaps between the cross-sectional portions, the offset in the x-direction may need to be varied from step to step depending on the portion of the elliptical beam that is reflected. In particular, the offset between adjacent steps should be approximately equal to the y-dimension of the respective redirected cross-sectional portions of the elliptical beam. For example, the offset may need to be less for the top and bottom stepped facets than it is for the stepped facets that reflect central portions of the elliptical beam. This is so because the y-dimension of cross-sectional portions, as depicted in FIG. 4B, will vary depending on their distance in the z-direction from the center of the elliptical beam. The optimal configuration of offsets between the stepped facets in the x-direction can be determined based on known and/or observed beam characteristics.

In another embodiment, the optical flux of the thin beam can be made more uniform by orienting the end-to-end facets at different angles about the y-axis such that adjacent cross-sectional portions overlap each other. The magnitude of the angles of the end-to-end facets can be different depending on the optical flux of the respective cross-sectional portions. For example, the end-to-end facets related to the peripheral portions of the beam (e.g., end-to-end facets 416-0 and 416-N) may have greater angles about the y-axis, which cause the respective portions of the beam to overlap with adjacent portions of the beam to a greater extent than the central cross-sectional portions.

In another embodiment, the optical flux of the thin beam can be made more uniform by providing an initial beam with a homogenized optical flux. A beam with a homogenized optical flux can be provided using an optical element that is external to the optical system. In an embodiment, a homogenizing lens structure is used to convert a beam having an unbalanced optical flux into a beam having a substantially homogenous optical flux. A homogenizing lens structure may include a "fly's-eye" lens, which includes multiple small lenslets that evenly distribute the optical flux of a beam across the cross-sectional footprint of the beam. A more homogenous thin beam can also be produced by applying a homogenizing lens structure to the thin beam after the thin beam is output from the optical system.

Figure 6A:
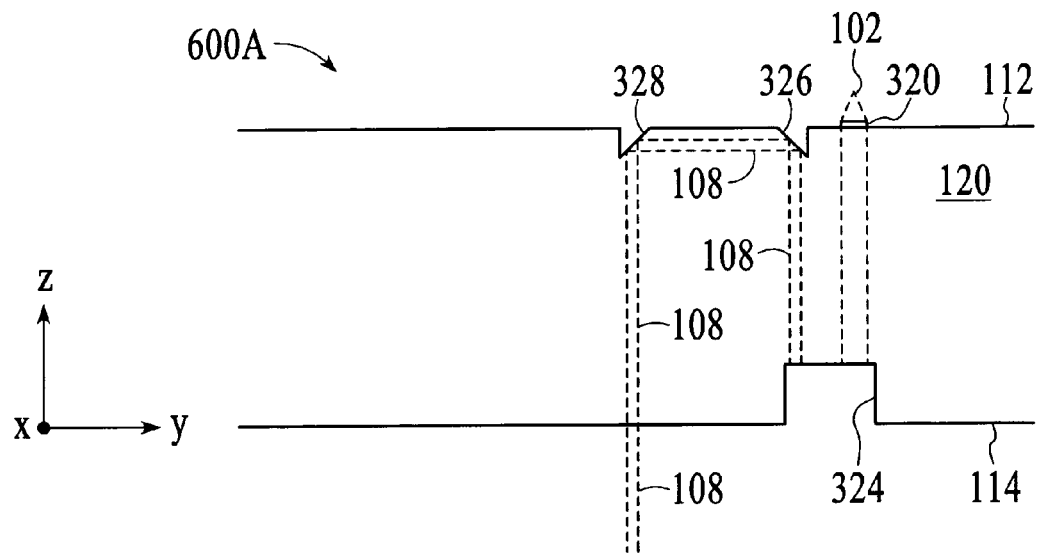
FIGS. 6A and 6B depict optical systems according to the invention.

In some applications, it is desirable to change the exit location of the thin beam. FIG. 6A depicts an optical system that utilizes additional reflectors to change the exit location of the thin beam. FIG. 6A depicts a system 600A that is similar to the systems depicted in FIGS. 3, 4A, and 5. The system is shown from along the x-axis such that the reflector 322 (as shown in FIGS. 3 and 5) is located behind the reducing manifold 324 and is not visible in the figure. In the system 600A an elliptical beam 102 enters the substrate 120 through the top surface 112 and a thin beam 108 exits the substrate through the bottom surface 114, opposite the first surface. The system 600A is the same as the system 300 except for the additional reflectors 326 and 328. The additional reflectors 326 and 328 may be etched, molded, or otherwise formed in the top surface 112. In the embodiment of FIG. 6A, the reflector 326 is oriented to receive the thin beam 108 from the reducing manifold 324 and to reflect the thin beam to reflector 328. In particular, the reflector 326 reflects the beam toward reflector 328 parallel to the top surface 112 of the substrate 120. Reflector 328 is oriented to receive the thin beam from the reflector 326 and to reflect the beam orthogonally toward the bottom surface 114.

In operation, an elliptical beam of light 102 is provided to the system 600A at the converging optical element 320. The converging optical element collimates the elliptical beam of light 102. The collimated light travels through the top surface 112 of the substrate 120 and is incident on the reflector 322 (FIG. 3). The reflector 322 reflects the elliptical beam of light 102 toward the reducing manifold 324. The reducing manifold 324 redirects cross-sectional portions of the light in such a way that the beam of light has a thin cross-sectional profile. To this point, the operation of the system 600A is as described above with reference to FIGS. 3, 4A, 4B, 4C, and 5. However, unlike the system 300 in FIG. 3, the reducing manifold 324 redirects the thin beam of light toward the reflector 326. The reflector 326 reflects the thin beam toward the reflector 328, which reflects the thin beam out of the substrate 120 through the bottom surface 114 of the substrate 120.

While FIG. 3 illustrates how the system 300 directs the thin beam 108 out through the same surface as that through which the elliptical beam of light 102 is received, FIG. 6A illustrates how the system 600A directs the thin beam 108 out through a different surface (i.e., the bottom surface 114) from that at which the elliptical beam of light 102 is received. In some applications, the former may be more desirable, while in other applications, the latter may be more desirable. In alternative embodiments, alternative elements may be added to redirect or manipulate light within the substrate 120. Additionally, although particular reflector configurations are shown, it is apparent that other reflector configurations are possible to achieve different exit locations for the thin beam.

Figure 6B:
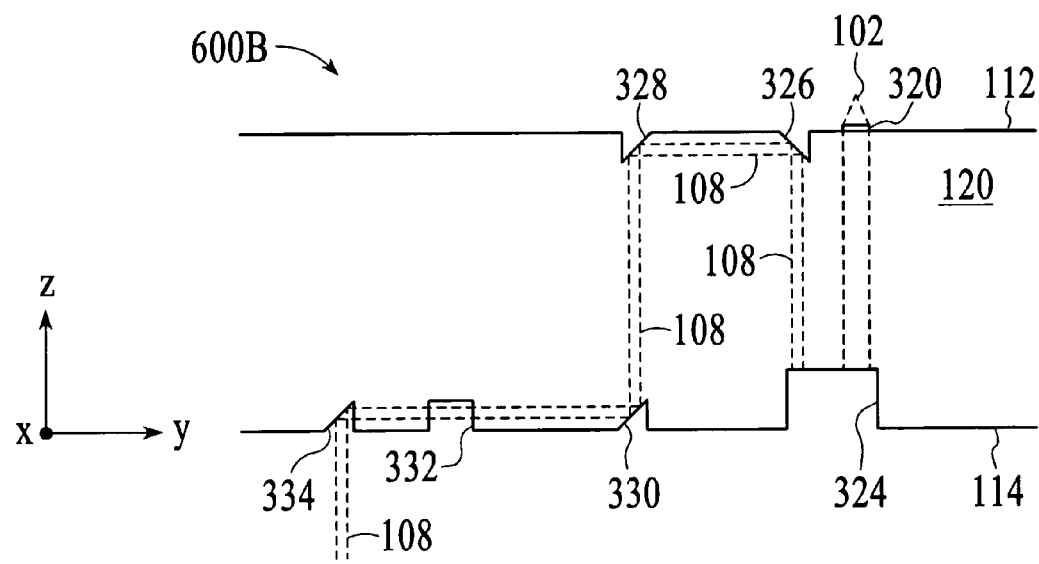

FIG. 6B depicts a system 600B in which a slanted gap is located in the optical path of a thin beam to account for differences in optical path length. The system 600B is the same as the system 600A except that it includes additional reflectors 330 and 334 and slanted gap 332. The reflector 330 is oriented to receive the thin beam 108 that is reflected by the reflector 328. The reflector 330 is oriented to reflect the received thin beam towards the reflector 334. The reflector 334 is oriented to reflect the thin beam out of the substrate through the bottom surface 114. The slanted gap 332 is located in an optical path that runs between the reflectors 330 and 334.

The operation of the system of FIG. 6B is the same as the system of FIG. 6A until the thin beam is incident on the reflector 330. The reflector 330 receives the thin beam that is reflected from the reflector 328. The reflector 330 reflects the thin beam through the slanted gap 332 to the reflector 334, which reflects the thin beam out of the substrate 120 through the bottom surface 114 as the thin beam 108. The reflector 330 and reflector 334 may be etched, molded or otherwise formed in the bottom surface 114. The reflector 334 may include a metallized facet for reflecting the thin beam through the bottom surface 114. In alternative embodiments, the slanted gap may be placed in different locations.

The slanted gap 332 may be etched, molded or otherwise formed in the bottom surface 114 of the substrate 120. The slanted gap 332 is filled with a material (e.g., air) that has a different refractive index than the substrate. The slanted gap 332 is configured to ensure that the cross-sectional portions 104 have equivalent optical path lengths. The lengths of the optical paths of the cross-sectional portions through the substrate 120 are typically different because of the offset between the stepped facets 414. For example, the optical path lengths of the cross-sectional portions that are reflected by the leading stepped facets will have shorter optical path lengths than the cross-sectional portions that are reflected by the trailing stripped facets. Referring to FIG. 4A, the leading stepped facet is facet 414-0 and the trailing stepped facet is facet 414-2.

In coherent applications, it is desirable that the optical path lengths be equivalent. In other words, it is desirable to equalize the relative lengths of the optical paths of the cross-sectional portions. Where a first optical path through the substrate 120 is shorter than a second optical path through the substrate 120, the equalizing can be accomplished by making the portion of the first optical path in the slanted gap 332 shorter than the portion of the second optical path in the slanted gap 332. The ratio of optical path length through the substrate 120 compared to the optical path length through the slanted gap 332 can be calculated using formulae that are well-known in the art of optical physics or through trial and error in a manner that is known in the art of optics. The slanted gap is typically configured such that the optical path length through the substrate plus the optical path length through the slanted gap results in equivalent optical path lengths for all the cross-sectional portions of the beam of light. The term equivalent, as used herein, means the optical paths are sufficiently similar that the optical paths may be treated as having the same length for a given application.

Figure 6C:
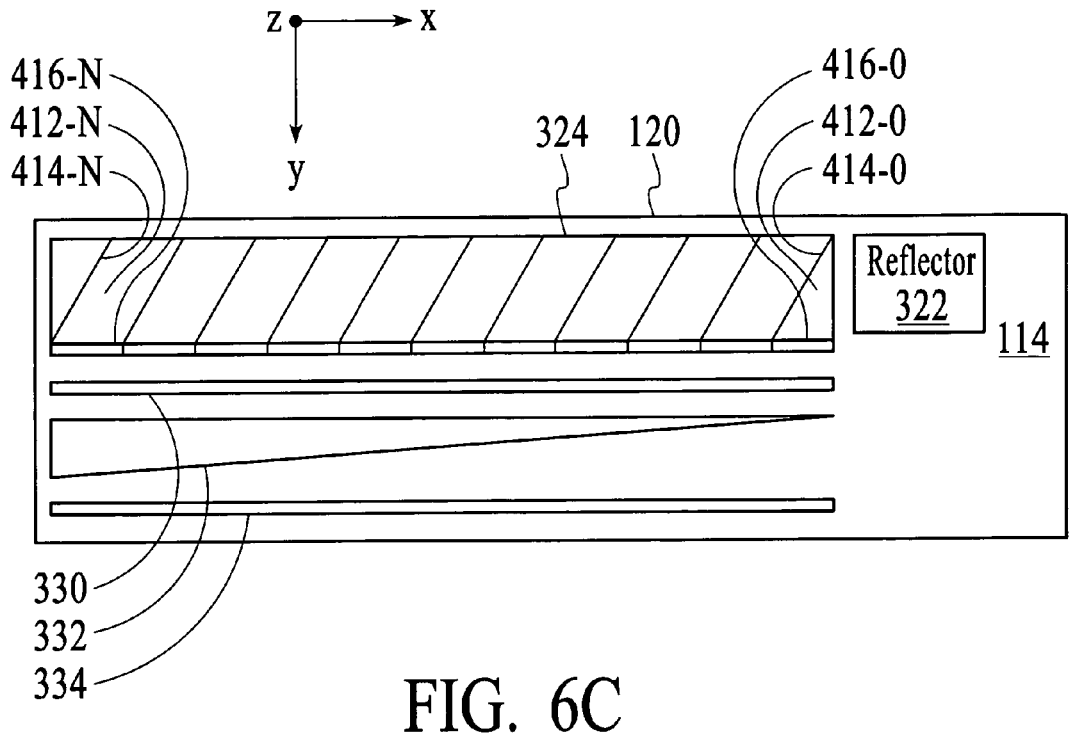
FIG. 6C depicts a bottom view of a substrate that corresponds to FIG. 6B.

FIG. 6C depicts a bottom view of a substrate that corresponds to FIG. 6B. The bottom view depicts the reducing manifold 324, the reflector 322, the reflector 330, the slanted gap 332, and the reflector 334 from FIG. 6B. As shown in FIG. 6C, the slanted gap is angled such that the cross-sectional portions that have shorter optical path lengths through the substrate have shorter optical path lengths through the slanted gap and such that the cross-sectional portions that have longer optical path lengths through the substrate have longer optical path lengths through the slanted gap. For example, the optical path through the slanted gap for the cross-sectional portion that is directed by stepped facet 414-0 is shorter than the optical path through the slanted gap for the cross-sectional portion that is directed by stepped facet 414-N.

Figure 7:
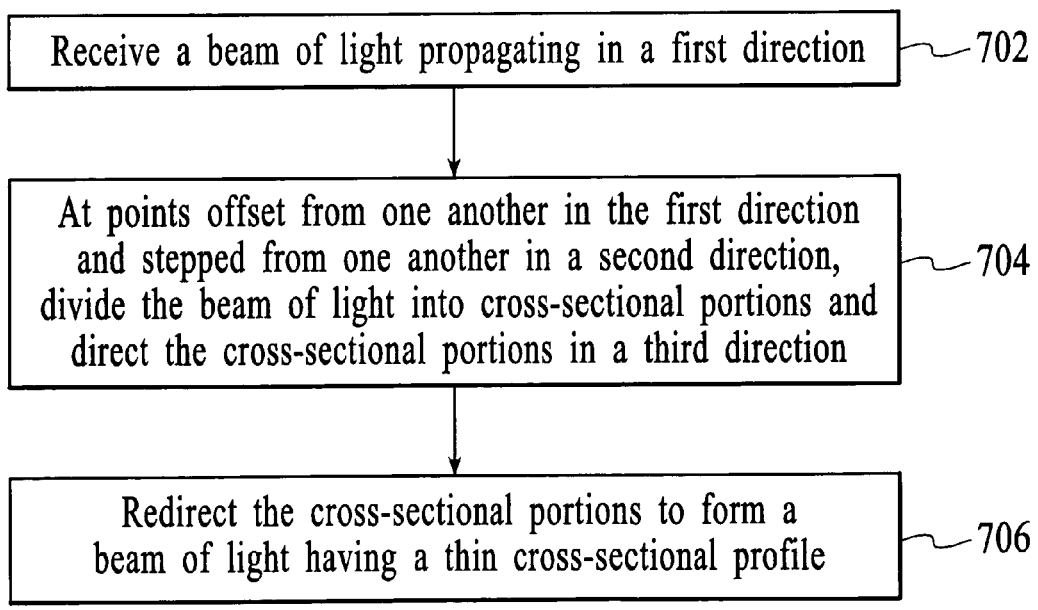
FIG. 7 is a process flow diagram of a method for changing the cross-sectional profile of an optical beam according to the invention.

FIG. 7 is a process flow diagram of a method for changing the cross-sectional profile of an optical beam according to the invention. At block 702, a beam of light, propagating in a first direction, is received. At block 704, at points offset from one another in the first direction and stepped from one another in a second direction, the beam of light is divided into cross-sectional portions and the cross-sectional portions are directed in a third direction. At block 706, the cross-sectional portions are redirected to form a beam of light having a thin cross-sectional profile.

Figure 8:
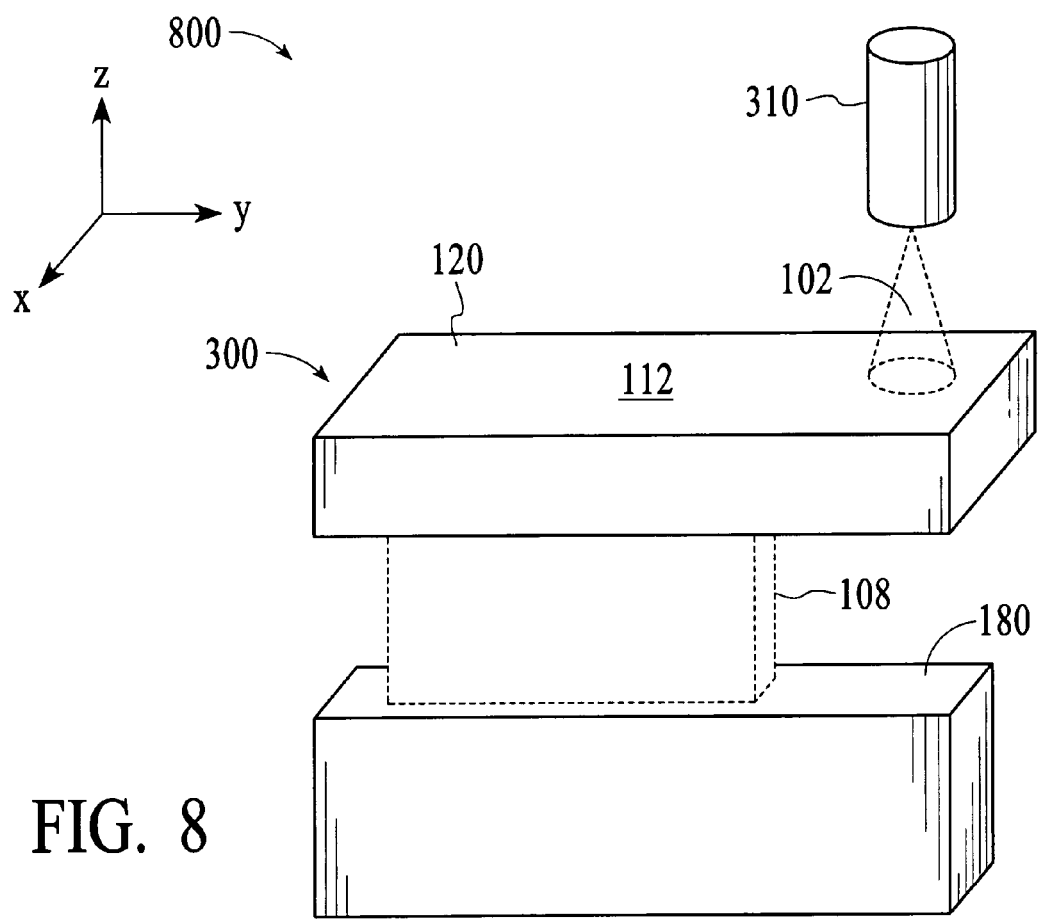
FIG. 8 depicts an optical system that includes an optical source, a micro-dimensional reducing system, and an optical component.

FIG. 8 depicts an optical system as described above, which is used in conjunction with an optical component 180, such as a linear grating, prism, cylindrical lens, reflector, sensor, liquid crystal array, or fiber optic array. The optical component 180 is configured to receive a thin beam 108 and typically has a thin geometry that is compatible with telecommunications systems that use thin geometries. The figure depicts an elliptical beam 102 from a source 310 that is changed to a thin beam 108 by the optical system 300 as described above. The thin beam 108 is then provided to the optical component 180.

An exemplary method for fabricating the optical system depicted in FIGS. 2, 3, 5, 6A, 6B, and 8 involves dividing the bottom surface 114 of a substrate 120 into three regions. In this example, a direct etch into silicon is assumed. The end-to-end facets 416 are located in the first region, the surfaces 412 are located in the second region, and the reflector 322 is located in the third region.

Figure 9A:
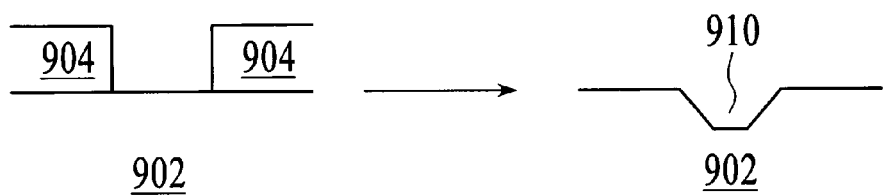
FIGS. 9A and 9B depict facets formed in a substrate according to the invention.

According to this exemplary method, the first region is fabricated first. In particular, the end-to-end facets 416 are fabricated as a single "V" groove. FIG. 9A illustrates the fabrication of a groove into silicon 902. First, an approach in which the silicon crystal planes are oriented to get a preferential etch along a crystalline axis is used. Next, resist 904 is placed over a portion of the silicon 902. Next, a preferential etch is made along a crystalline axis. This results in a groove 910 at approximately 42° to the major surface of the silicon substrate. The groove 910 runs the entire length of the reducing manifold 324 (FIG. 5).

The second region is fabricated next using multiple etches with respective masks. Each step of the reducing manifold is formed by etching the bottom surface of the substrate to form the surfaces 412 as shown in FIGS. 4A and 5. The process begins with covering the bottom surface 114 of the substrate 120 with a mask. The mask covers the bottom surface of the substrate except for the location of the substrate that will have the deepest of the surfaces 412. The substrate is then etched to a desired depth in the exposed area. A new mask is then formed on the bottom surface of the substrate that exposes the first etched surface and the next surface that is to be formed. The substrate is etched again to a desired depth in the exposed area. The etching forms a second etched surface and causes the first etched surface to be formed at a depth that is the total of the first two etch depths. The difference in depths of the two adjacent surfaces forms the stepped facets 414 as shown in FIGS. 4A and 5. The process is repeated to form all of the surfaces 412 and stepped facets 414. FIGS. 10A through 10D depict the masked area 1050 and exposed area 1052 of the bottom surface 114 of substrate 120 for four successive etch steps. The stepped facets 1014 that are formed by the successive etched steps are represented by the dashed lines in FIGS. 10B through 10D.

Figure 9B:
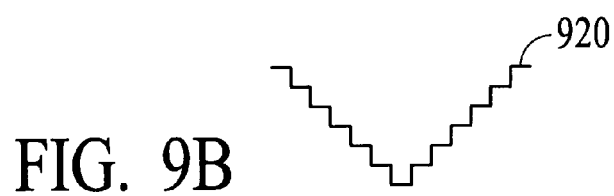
Figure 10A:
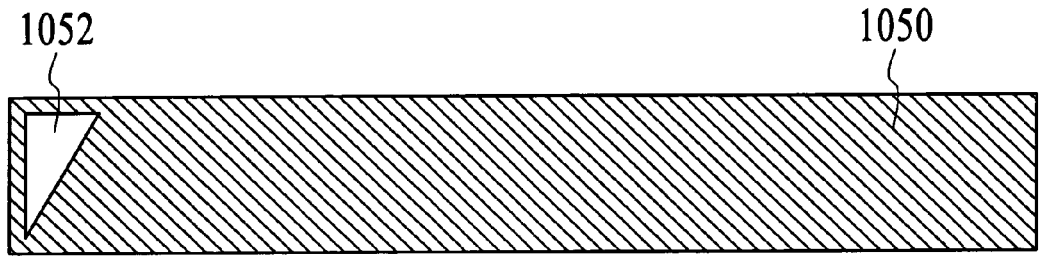
FIGS. 10A through 10D depict the masked area and exposed area of the bottom surface of a substrate during the formation of the reducing manifold.
Figure 10B:
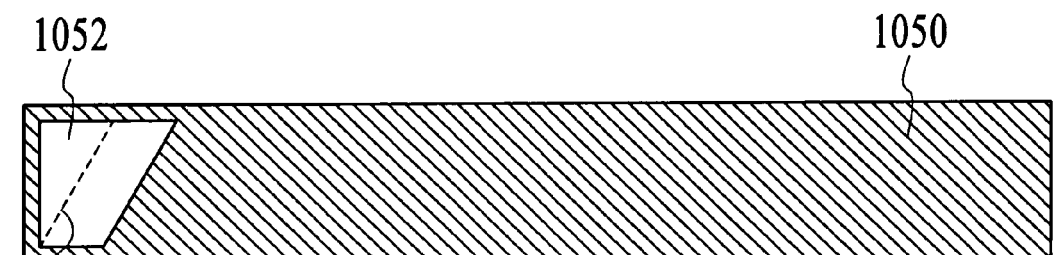
Figure 10C:
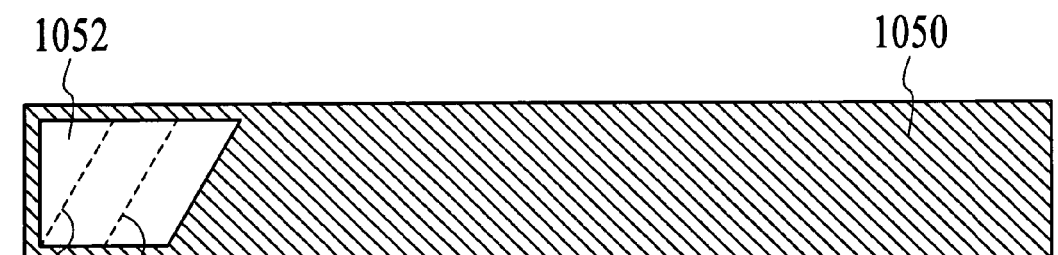
Figure 10D:
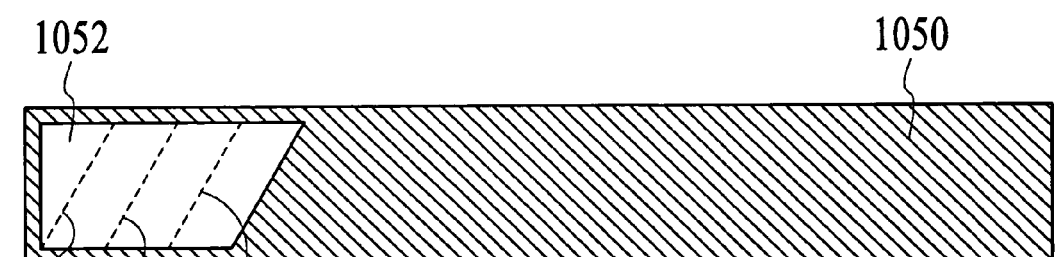

The third region is fabricated last. As previously indicated, the third region includes the reflector 322. Since fabricating the end-to-end facets 416 has utilized the preferential etch along a crystalline axis, another method is used to fabricate slanted sidewalls at approximately 45 degrees. Methods that can be used to fabricate slanted sidewalls at approximately 45 degrees include:

1) using a preferential crystalline etch, as discussed above with reference to FIG. 9A;
2) shaping the photo resist so resist sidewalls are slanted, then etching to preserve the profile shape;
3) using grey level mask to etch a slanted sidewall; and
4) using an anisotropic (e.g., silicon-eroding) etch or isotropic (e.g., resist-eroding) etch to get a stepped structure, such as the stepped structure 920 shown in FIG. 9B. In an embodiment, each step of the stepped structure 920 is approximately 10 nanometers in height and width so light cannot resolve the steps.

The fabrication method described herein is exemplary. Other fabrication methods may be used. For example, in an alternative, a mold is made by forming a master in Si or $SiO_2$. The master is electroformed (e.g., put in a chemical bath and electroplated). In an embodiment, the electroplating deposits nickel on the master surface. The nickel is then "peeled" from the master surface and is used as a mold. The profile of the mold is inverted relative to the master. Molten plastic, glass, or other material poured into the mold hardens to replicate the shape of the master. Upon separation, the plastic, glass, or other material includes the reducing manifold 324 and reflector 322.

In alternative embodiments, the beam of light that enters the optical system may have a non-elliptical cross-sectional profile, for example, a square or rectangular cross-sectional profile.

Although the above-described techniques for changing the cross-sectional profile of a beam of light have been described in terms of micro-structures (e.g., in the micrometer size range), the techniques are also applicable to larger, macro-structures.

Although specific embodiments of the invention have been described and illustrated, the invention is not to be limited to the specific forms or arrangements of parts as described and illustrated herein. The invention is limited only by the claims.

What is claimed is:

1. An optical device for changing the cross-sectional profile of a beam of light comprising:
   first facets oriented to direct cross-sectional portions of a beam of light that propagates in a first direction, said first facets being offset from each other in a direction that is aligned with said first direction; and
   second facets oriented to redirect said cross-sectional portions to form a beam of light having a thin cross-sectional profile.

2. The optical device of claim 1, wherein said second facets are oriented to concatenate said cross-sectional portions to form said beam of light having said thin cross-sectional profile.

3. The optical device of claim 1, additionally comprising a substrate in which said facets are defined and through which said beam of light and said cross-sectional portions propagate.

4. The optical device of claim 3, in which:
   said substrate comprises a first major surface and a second major surface opposite said first major surface; and
   said facets are located in said substrate adjacent said second major surface.

5. The optical device of claim 4, additionally comprising a reflector located in said substrate adjacent said second major surface and oriented to reflect said beam of light in said first direction towards said first facets.

6. The optical device of claim 4, additionally comprising:
   a first additional reflector located in said substrate adjacent said first major surface, positioned to receive said beam of light having said thin cross-sectional profile, and oriented to reflect said beam of light having said thin cross-sectional profile substantially parallel to said first major surface; and
   a second additional reflector located in said substrate adjacent said first major surface, positioned to receive said beam of light having said thin cross-sectional profile from said first additional reflector and oriented to reflect said beam of light having said thin cross-sectional profile towards said second major surface for output through said second major surface.

7. The optical device of claim 3, additionally comprising:
   a slanted gap defined in said substrate, filled with a material having a refractive index different from said substrate and located to intersect said beam of light having said thin cross-sectional profile, said slanted gap structured to provide said cross-sectional portions constituting said beam of light with equal optical path lengths.

8. A method for changing the cross-sectional profile of a beam of light, the method comprising:
   receiving a beam of light propagating in a first direction;
   at points offset from one another in said first direction and stepped from one another in a second direction, dividing said beam of light into cross-sectional portions and directing said cross-sectional portions in a third direction; and
   redirecting said cross-sectional portions to form a beam of light having a thin cross-sectional profile.

9. The method of claim 8, wherein said redirecting includes concatenating said cross-sectional portions to form said beam of light having said thin cross-sectional profile.

10. The method of claim 9, wherein said redirecting includes redirecting said cross-sectional portions in said second direction.

11. The method of claim 8, in which said directing comprises directing said cross-sectional portions along optical paths having equal optical path lengths.

12. The method of claim 8, in which said receiving comprises:
    receiving said beam of light in one of said second direction and a direction opposite said second direction; and
    reflecting said beam of light in said first direction.

13. The method of claim 8 wherein said received beam of light has an elliptical cross-sectional profile.

14. An optical device for changing the cross-sectional profile of a beam of light, the optical device comprising:
    first reflective facets offset in a first direction and stepped in a second direction, substantially orthogonal to said first direction, said first facets arranged to be illuminated by a beam of light that propagates in said first direction, each of said first facets being oriented to reflect a cross-sectional portion of said beam of light in a third direction substantially orthogonal to said first direction and to said second direction; and
    a second reflective facet associated with each of said first facets, said second facet oriented to reflect said cross-sectional portion reflected by said associated first facet in said second direction, said cross-sectional portions reflected by said second facets being concatenated in said first direction to form a beam of light having a thin cross-sectional profile.

15. The optical device of claim 14, in which said first reflective facets are oriented at approximately 45 degrees off of a plane parallel to said second direction and said third direction such that said first reflective facets face towards said second reflective facets.

16. The optical device of claim 14, additionally comprising a substrate in which said facets are defined and through which said beam of light and said cross-sectional portions propagate.

17. The optical device of claim 16, in which:
    said substrate comprises a first major surface and a second major surface opposite said first major surface; and
    said facets are located in said substrate adjacent said second major surface.

18. The optical device of claim 17, additionally comprising a reflector located in said substrate adjacent said second major surface and oriented to reflect said beam of light in said first direction towards said first facets.

19. The optical device of claim 17, additionally comprising:
   a first additional reflector located in said substrate adjacent said first major surface, positioned to receive said beam of light having said thin cross-sectional profile, and oriented to reflect said beam of light having said thin cross-sectional profile substantially parallel to said first major surface; and
   a second additional reflector located in said substrate adjacent said first major surface, positioned to receive said beam of light having said thin cross-sectional profile from said first additional reflector and oriented to reflect said beam of light having said thin cross-sectional profile towards said second major surface for output through said second major surface.

20. The optical device of claim 16, additionally comprising:
   a slanted gap defined in said substrate, filled with a material having a refractive index different from said substrate and located to intersect said beam of light having said thin cross-sectional profile, said slanted gap structured to provide said cross-sectional portions constituting said beam of light with equal optical path lengths.

* * * * *